United States Patent
Jayaweera et al.

(10) Patent No.: US 9,321,015 B2
(45) Date of Patent: Apr. 26, 2016

(54) PROCESS FOR FABRICATING PBI HOLLOW FIBER ASYMMETRIC MEMBRANES FOR GAS SEPARATION AND LIQUID SEPARATION

(71) Applicant: SRI INTERNATIONAL, Menlo Park, CA (US)

(72) Inventors: Indira Jayaweera, Menlo Park, CA (US); Gopala N. Krishnan, Menlo Park, CA (US); Angel Sanjurjo, Menlo Park, CA (US); Palitha Jayaweera, Menlo Park, CA (US); Srinivas Bhamidi, Menlo Park, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 115 days.

(21) Appl. No.: 14/190,100

(22) Filed: Feb. 26, 2014

(65) Prior Publication Data

US 2014/0175007 A1 Jun. 26, 2014

Related U.S. Application Data

(63) Continuation of application No. PCT/US2012/054033, filed on Sep. 6, 2012.

(60) Provisional application No. 61/531,448, filed on Sep. 6, 2011.

(51) Int. Cl.
| | | |
|---|---|---|
| *B01D 39/00* | (2006.01) | |
| *B01D 33/21* | (2006.01) | |
| *B01D 63/02* | (2006.01) | |
| *B01D 69/00* | (2006.01) | |
| *B01D 67/00* | (2006.01) | |
| *B01D 59/26* | (2006.01) | |
| *B01D 61/00* | (2006.01) | |
| *B01D 69/08* | (2006.01) | |
| *B01D 53/22* | (2006.01) | |
| *C02F 1/44* | (2006.01) | |
| *B01D 71/62* | (2006.01) | |

(52) U.S. Cl.
CPC ............ *B01D 69/087* (2013.01); *B01D 53/228* (2013.01); *B01D 71/62* (2013.01); *C02F 1/444* (2013.01); *B01D 2256/16* (2013.01); *B01D 2257/502* (2013.01); *B01D 2257/504* (2013.01); *B01D 2257/7025* (2013.01); *B01D 2323/12* (2013.01); *B01D 2325/02* (2013.01); *B01D 2325/04* (2013.01); *B01D 2325/30* (2013.01); *Y02C 10/10* (2013.01); *Y02C 20/20* (2013.01)

(58) Field of Classification Search
CPC ............ Y02C 10/10; B01D 2257/504; B01D 53/228; B01D 53/22; B01D 71/64; B01D 2256/22; B01D 2257/108; B01D 53/62; B01D 67/0009; B01D 69/08; B01D 69/088; B01D 2323/12; B01D 2323/22; B01D 2325/022; B01D 63/02; B01D 67/0016
See application file for complete search history.

(56) References Cited

U.S. PATENT DOCUMENTS

| | | | | | |
|---|---|---|---|---|---|
| 4,634,530 | A * | 1/1987 | Kuder | ................ | B01D 67/0093 210/500.23 |
| 4,871,494 | A * | 10/1989 | Kesting | .............. | B01D 67/0011 210/500.23 |
| 4,882,223 | A * | 11/1989 | Aptel | .................... | A23C 9/1422 210/500.22 |
| 5,013,436 | A * | 5/1991 | Lee | ...................... | B01D 61/362 210/321.8 |
| 5,034,026 | A * | 7/1991 | Summers | ................ | C08G 73/22 95/47 |
| 5,085,675 | A * | 2/1992 | Kriebel | .............. | B01D 53/1462 423/574.1 |
| 5,085,676 | A * | 2/1992 | Ekiner | ................... | B01D 69/08 210/500.23 |
| 5,143,526 | A * | 9/1992 | Lee | ...................... | B01D 3/322 210/195.2 |
| 5,683,584 | A * | 11/1997 | Wenthold | ............... | B01D 61/30 210/490 |
| 6,015,516 | A * | 1/2000 | Chung | .................... | D01D 5/24 264/129 |
| 7,771,518 | B2 * | 8/2010 | Yoshinaga | ........... | B01D 53/228 210/500.27 |
| 2003/0159980 | A1 * | 8/2003 | Barss | ................. | B01D 67/0006 210/321.8 |
| 2011/0266222 | A1 * | 11/2011 | Wang | .................... | B01D 63/02 210/650 |
| 2011/0266223 | A1 * | 11/2011 | Yang | .................... | B01D 69/088 210/651 |
| 2011/0316181 | A1 * | 12/2011 | Liu | ....................... | B01D 53/228 264/45.5 |
| 2014/0137735 | A1 * | 5/2014 | Bhandari | ............. | B01D 69/141 95/47 |
| 2014/0175007 | A1 * | 6/2014 | Jayaweera | ............. | C02F 1/444 210/500.23 |
| 2015/0033945 | A1 * | 2/2015 | Yamada | ............... | B01D 53/228 96/14 |

* cited by examiner

Primary Examiner — Ana Fortuna
(74) Attorney, Agent, or Firm — Richard Aron Osman

(57) ABSTRACT

The invention provides methods for preparing an asymmetric hollow fiber, the asymmetric hollow fibers prepared by such methods, and uses of the asymmetric hollow fibers. One method involves passing a polymeric solution through an outer annular orifice of a tube-in-orifice spinneret, passing a bore fluid though an inner tube of the spinneret, dropping the polymeric solution and bore fluid through an atmosphere over a dropping distance, and quenching the polymeric solution and bore fluid in a bath to form an asymmetric hollow fiber.

14 Claims, No Drawings

PROCESS FOR FABRICATING PBI HOLLOW FIBER ASYMMETRIC MEMBRANES FOR GAS SEPARATION AND LIQUID SEPARATION

CROSS-REFERENCE TO RELATED APPLICATIONS

This application claims priority to U.S. Ser. No. 61/531,448, filed Sep. 6, 2011, the disclosure of which is incorporated herein by reference in its entireties.

STATEMENT OF GOVERNMENT INTEREST

This invention was made with United States Government support under N00014-10-C-0059 awarded by the Office of Naval Research, and under DE-FC26-07NT43090 awarded by the Department of Energy. The United States Government has certain rights in this invention.

INTRODUCTION

Many industries from water treatment to gas separations use membrane processes for separation and purification. These processes commonly use polymeric membranes in flat sheet or hollow fiber form. The hollow fiber membranes are more widely used than flat sheet membranes because of their high surface area to volume ratio.

Relevant art includes U.S. Pat. Nos. 7,771,518, 5,683,584, and US 2011/0266223.

SUMMARY OF THE INVENTION

In one aspect, the invention provides a method for preparing an asymmetric hollow fiber, the method comprising: (a) passing, through an outer annular orifice of a tube-in-orifice spinneret, a polymeric solution comprising: (i) 15-25 wt % of a polybenzimidazole; (ii) 1-5 wt % of a polymeric pore-forming material; and (iii) a solvent with respect to the polybenzimidazole; (b) passing, though an inner tube of the spinneret, a bore fluid comprising: (i) 65-99 wt. % of a non-solvent with respect to the polybenzimidazole; and (ii) 1-35 wt. % of a solvent with respect to the polybenzimidazole, wherein the bore fluid maintains the polymeric solution in an annular shape; (c) dropping the polymeric solution and bore fluid through a gap, wherein the gap comprises an atmosphere and a dropping distance of 0.3 to 20 cm; (d) quenching the polymeric solution and bore fluid in a bath to form an asymmetric hollow fiber having an annular shape and comprising first and second concentric layers, wherein the first layer contacts the second layer and is non-porous, and wherein the second layer is porous having pores in the range 5-250 nm.

In embodiments:

The method further comprises taking up the fiber into a fiber bundle at a rate of 1-100 meters/min. The fiber bundle can be used as a hollow fiber membrane in suitable membrane applications such as those described herein.

The polymeric solution is stable against chemical degradation for at least 6 months within a temperature range of 15-25° C.

The method further comprises post-spinning washing and drawing of the fiber. The post-spinning procedures, for example, increase the mechanical strength of the fibers.

The polybenzimidazole is sulfonated polybenzimidazole.

The first layer forms an outer surface and the second layer forms an inner surface of the asymmetric hollow fiber.

The first layer forms an inner surface and the second layer forms an outer surface of the asymmetric hollow fiber The thickness of the first and second layers is controlled by the length of the dropping distance and by the relative polarities of the solvent and non-solvent.

The first layer has a thickness in the range 0.1-10 μm, and wherein the second layer has a thickness in the range of 10-500 μm.

The chemical composition of the first layer and the chemical composition of the second layer are the same.

The polymer precipitate partially solidifies during the dropping and fully solidifies during the quenching.

The outer annular orifice of the tube-in-orifice spinneret has an outside diameter in the range 100-2000 μm.

The thickness of the first and second layers is controlled by the length of the dropping distance and by the relative polarities of the solvent and non-solvent, and wherein the polybenzimidazole is sulfonated polybenzimidazole.

The first layer has a thickness in the range 0.1-10 μm, and wherein the second layer has a thickness in the range of 10-500 μm, and wherein the polymer precipitate partially solidifies during the dropping and fully solidifies during the quenching.

In another aspect, there is provided an asymmetric hollow fiber comprising first and second concentric layers forming a wall of the fiber, wherein: the asymmetric hollow fiber comprises a polybenzimidazole material; the first layer is non-porous and the second layer is porous having pores in the range 5-250 nm; and the asymmetric hollow fiber has an outside diameter in the range 100-2000 μm.

In embodiments:

The polybenzimidazole is sulfonated polybenzimidazole.

The asymmetric hollow fiber is stable against chemical degradation up to 400° C.

The first layer has a thickness in the range 0.1-10 μm, and wherein the second layer has a thickness in the range of 10-500 μm.

The first layer forms an outer surface and the second layer forms an inner surface of the asymmetric hollow fiber.

In another aspect, there is provided a membrane comprising the asymmetric hollow fiber comprising: a polybenzimidazole; and first and second concentric layers, wherein the first layer is non-porous and the second layer is porous having pores in the range 5-250 nm, wherein the fiber has an outside diameter in the range 100-2000 μm.

In embodiments:

The membrane is used in a method for separating $H_2$ from a gas mixture comprising $H_2$, $CO_2$, CO, and methane, the method comprising passing the gas mixture through the membrane.

The membrane is used in a method for removing impurities from a water solution, the method comprising passing the water solution through the membrane.

The invention specifically provides all combinations of the recited aspects, as if each had been laboriously individually set forth.

DETAILED DESCRIPTION OF PARTICULAR EMBODIMENTS

In one aspect, the invention provides a method for preparing an asymmetric hollow fiber, the method comprising: (a) passing, through an outer annular orifice of a tube-in-orifice spinneret, a polymeric solution comprising: (i) 15-25 wt % of a polybenzimidazole; (ii) 1-5 wt % of a polymeric pore-forming material; and (iii) a solvent with respect to the polybenzimidazole; (b) passing, though an inner tube of the spinneret, a bore fluid comprising: (i) 65-99 wt. % of a non-solvent with respect to the polybenzimidazole; and (ii) 1-35 wt. % of a solvent with respect to the polybenzimidazole, wherein the bore fluid maintains the polymeric solution in an annular shape; (c) dropping the polymeric solution and bore fluid through an atmosphere over a dropping distance of 0.3 to 20 cm; (d) quenching the polymeric solution and bore fluid in a bath to form an asymmetric hollow fiber comprising first and second concentric layers, wherein the first layer is non-porous and the second layer is porous having pores in the range 5-250 nm.

The polymeric solution carries the polymeric material that forms the asymmetric hollow fibers, and in some embodiments carries one or more additional components such as a pore-forming material, salts, pH-modifying agents, viscosity modifying agents, and one or more solvents.

The polymeric solution comprises a polybenzimidazole (PBI). In some embodiments, the PBI is sulfonated. Sulfonation can be carried out using any convenient method. For example, the sulfonated version of PBI can be readily prepared by treating with sulfuric acid to form covalently bonded $SO^{3-}$ with the proton forming a stable bond with the nitrogen of the imidazole ring. Sulfonated PBI (SPBI) hollow-fibers provide higher chlorine tolerance, water flux, and salt rejection rates. The PBI can be present in an amount effective to create asymmetric hollow fibers according to the inventive methods. In embodiments, the PBI is present in an amount ranging from 10-30, or 15-25, or 15-20 wt %, or in an amount greater than 10, 15, 17, 20, or 25 wt %, or less than 30, 25, 22, 20, or 18 wt %. More than one type of PBI can be present, provided that the total weight percent is within the given ranges.

In embodiments, the polymeric solution comprises a pore forming material. The pore forming material is a material that causes or aids the formation of pores in the materials of the invention. For example, the pore forming material aids the solvent exchange mechanism of pore formation. Any appropriate pore forming material can be used. Examples of pore forming materials are compounds containing multiple hydroxyl groups, such as glycols and polyols. Examples include isopropanol, ethylene glycol, propylene glycol, polyvinylalcohol, saccharides and polysaccharides, and the like. Another example of a pore-forming material is PVP. The pore forming material is present in the polymeric solution in an amount sufficient to cause the desired porosity in the resulting asymmetric hollow fibers. In embodiments, the pore forming material is present in the polymeric solution in the range 1-5 wt %, or 1-3 wt %, or less than 5, 4, 3, or 2 wt %, or greater than 1, 2, 3, or 4 wt %.

The polymeric solution comprises a solvent with respect to the PBI. Such a solvent is able to fully dissolve the PBI present in the solution and under the conditions used in the inventive methods. Examples of suitable solvents are N,N-dimethylacetamide (DMAc), dimethylsulfoxide (DMSO), N-N-dimethylformamide (DMF), N-methyl-2-pyrrolidine (NMP), pyridine and the like. Combinations of solvents are also suitable.

The polymeric solution may further comprise one or more additives such as LiCl (e.g., as a stabilizer of PBI).

The polymeric solution is stable against chemical degradation for at least 6 months under ambient conditions, such as within a temperature range of 15-25° C. In some embodiments, the polymeric solution is stable for at least 9 or 12 months. Thus, the components of the polymeric solution (particularly the PBI component) do not undergo significant degradation over the period of stability. For example, there is less than 10, 8, 5, 3, 2, or 1% degradation of the PBI component in a polymeric solution over the period of stability provided that the solution is maintained in a temperature range of 15-25° C.

The inventive methods involve passing the polymeric solution through an outer annular orifice of a tube-in-orifice spinneret. The passing can be carried out at elevated pressure (i.e., the polymeric solution can be forced through the orifice), or the solution can be allowed to drop out of the orifice under the influence of gravity and at ambient pressure. Oriented below the outer annular orifice is a gap that may conveniently be segmented into an expansion region immediately below the outer annular orifice and an elongation region below the expansion region. Upon emergence from the outer orifice of the spinneret, the polymeric solution (which has the annular shape of the annular orifice) first enters the expansion region where it expands in circumference slightly. The polymeric solution moves through the expansion region and then enters the elongation region where the circumference is reduced. In some embodiments, a portion of the solvent evaporates from the polymeric solution as the polymeric solution passes through the gap. The evaporation increases the concentration of PBI within the polymeric solution, and some solidification of the PBI may take place within the gap. The polymeric solution moves through the elongation region of the gap and enters a bath positioned below the gap. The bath functions to coagulate the PI within the polymeric solution, such that the PBI solidifies completely within the bath. Furthermore, solvent exchange occurs within the bath (i.e., solvent from the polymeric solution exchanges with solvent from the bath). The solvent exchange results in the formation of pores within the solidifying PBI.

The inventive methods further involve passing a bore fluid through an inner tube of the tube-in-orifice spinneret. The inner tube is centrally positioned (with respect to the center axis of the spinneret) within the outer annular orifice. The bore fluid is used to maintain the polymeric solution in an annular shape during the dropping of the polymeric solution through the gap and into the bath. Thus, bore fluid emerges from the inner tube at the same time that polymeric solution emerges from the outer annular orifice.

The bore fluid comprises a mixture of a solvent with respect to the PBI and a non-solvent with respect to the PBI. In embodiments, the bore fluid comprises 65-99 wt %, or greater than 65, 70, 75, 80, 85, or 90 wt %, or less than 99, 95, 90, 85, 80, 75, or 70 wt % of the non-solvent. In embodiments, the bore fluid comprises 1-35 wt %, or greater than 5, 10, 15, 20, 25, or 30 wt %, or less than 35, 30, 25, 20, 15, 10, or 5 wt % of the solvent with respect to the polybenzimidazole.

The non-solvent with respect to the PBI is a solvent that does not appreciably dissolve PBI under temperatures and pressures used in the inventive methods. For example, the non-solvent is able to dissolve less than 10, 5, 1, 0.5, or 0.1% of the weight of PBI that a similar volume of solvent is able to dissolve. Examples of non-solvents for PBI include water and alcohols such as methanol, ethanol, i-propanol, n-propanol, etc.

By applying a liquid as a bore fluid, a phase transition can be induced and the fiber morphology near the inner surface can be controlled through phase inversion.

The bath is filled with a non-solvent with respect to PBI. The non-solvent in the bath may the same, or may be different from, the non-solvent present in the bore fluid. The precipitation of PBI resulting from the polymeric solution entering the bath is referred to herein as quenching. The quenching of the polymeric solution and bore fluid creates the asymmetric hollow fiber having an annular shape and having first and second concentric layers as described herein. In some embodiments the annular shape of the hollow fiber is identical to the annular shape of the polymeric solution (i.e., surrounding the bore fluid) passing through the gap. In some embodiments, swelling or contracting other minor variations cause the annular shape of the hollow fiber to be non-identical to the annular shape of the polymeric solution in the gap, although the hollow fiber shape will nevertheless be derived from the annular shape of the polymeric solution in the gap.

The gap comprises an atmosphere. The atmosphere may be air, a single gas such as nitrogen or argon, or any desired composition of gases. The length of the gap between the spinneret and the bath is referred to herein as the dropping distance. The dropping distance may be any length in the range 0.3-20 cm, such as greater than 0.3, 0.5, 1, 3, 5, 10, or 15 cm, or less than 20, 15, 10, 5, 3, or 1 cm. The relative lengths of the swelling and elongation regions will depend on a variety of factors such as the solution parameters, the atmosphere within the gap, and the like.

The inventive methods result in the formation of asymmetric hollow fibers comprising a PBI material. The method may further include post-spinning procedures. For example, post-spinning procedures include washing and drawing the fiber. Washing may be with a non-solvent or mixture of non-solvents for PBI, such as water, alcohol, glycol, or polyol solvents. Drawing can include any method for stretching the fibers, such as stretching though a double roller or stretching lengthwise using any appropriate method. In some embodiments such post-spinning procedures increase the mechanical strength of the fibers. Such increase in mechanical strength may be by at least 100, 150, or 200%, and may refer to tensile strength or other measures of fiber strength.

The asymmetric hollow fibers have a "donut" shape in cross-section. Thus the fiber comprises (in cross-section) a wall having a ring shape, wherein the wall comprises first and second concentric (and contacting) layers. The difference between the outer diameter of the ring and the inner diameter of the ring represents twice the thickness of the fiber wall.

The inventive hollow fibers are asymmetric in that they comprise first and second concentric layers, wherein the first layer is non-porous and contacts the second layer, and the second layer is porous. In some embodiments, the first layer forms an outer surface and the second layer forms an inner surface of the asymmetric hollow fiber. In other embodiments, the first layer forms an inner surface and the second layer forms an outer surface of the asymmetric hollow fiber. Because of the porosity of the second layer, the first layer is typically denser than the second layer. In embodiments, the first layer is at least 1.1, 1.3, 1.5, 2, 3, 4, or 5 times denser than the second layer.

The thickness of the first and second layers is controlled by the length of the dropping distance and by the relative polarities of the solvent and non-solvent. In some embodiments, the first layer has a thickness in the range 0.1-10 µm, such as at least 0.1, 0.5, 1, 2, 3, 5, or 8 µm, or less than 10, 8, 5, 3, 2, 1, or 0.5 µm. In some embodiments, the second layer has a thickness in the range of 10-500 µm, such as at least 10, 25, 50, 100, 150, 200, 250, or 300 µm, or less than 500, 300, 250, 200, 150, 100, 50, or 25 µm. In some embodiments, the relatively less dense second layer has a thickness that is at least 10, 20, 50, 100, or 500 times greater than the relatively more dense first layer. The thickness of the various layers is measured as a cross-section of the fiber.

The transition region between the first and second layers may be very sharp, such as less than 0.5, 0.1, 0.05, or 0.01 times the thickness of the first layer. In the transition region, the fiber material transitions from porous to non-porous (i.e. relatively low density to relatively high density). In some embodiments, the transition region is thicker, and porosity decreases gradually over a region having a thickness at least 0.5, 0.8, or 1 times the thickness of the first layer.

In embodiments, the porous second layer has interconnected nanometer scale pores. For example, the pores have an average diameter in the range of 5-250 nm, or greater than 5, 25, 50, 100, 150, or 200 nm, or less than 250, 200, 150, 100, 50, or 25 nm. The pores may be spherical, partially spherical, or irregular in shape. The degree and size of pores in the second layer is determined in part by the polarities of the solvent and non-solvent used (which affects the solvent exchange mechanism for pore formation). Other factors include the bath solvent temperature and pressure, and the rate and extent of solvent evaporation within the gap.

The dimensions of the annular spinneret hole, hollow fiber dimension, shear stress within a spinneret, dope flow rate, the polymer-to-bore volumetric flow rate ratio, and the take-up-to-initial velocity ratio (draw ratio) are the primary factors that determine the final fiber structure.

In embodiments, the chemical composition of the first layer and the chemical composition of the second layer are the same. Thus, for example, the first and second layers are both made of the same PBI material selected from the materials described herein.

In embodiments, the asymmetric hollow fiber is stable up to 400° C. Thus, up to 400° C., there is little or no degradation (i.e., less than 10, 5, 3, or 1 wt %) of the fiber material.

The outer annular orifice of the tube-in-orifice spinneret has an outside diameter in the range 100-2000 µm. Thus, the final asymmetric hollow fibers may have an outside diameter within the range of 100-2000 µm, such as greater than 100, 200, 300, 400, 500, 1000, or 1500 µm, or less than 2000, 1500, 1000, 500, 400, 300, or 200 µm. The inside diameter (i.e., the diameter of the cavity within the hollow fibers) will be determined by the outside diameter and the thickness of the first and second layers (and thus, for example, may be within the range 90-1990 µm).

The inventive asymmetric hollow fibers may be used to form a hollow fiber membrane (HFM). For example, the spinning procedure described herein may further comprise taking up the fiber at a rate of 1-100 meters/min to form a HFM.

The membrane may be used in a method for separating $H_2$ from a gas mixture comprising $H_2$, $CO_2$, CO, and methane, the method comprising passing the gas mixture through the membrane.

The membrane may be used in a method for removing impurities from a water solution, the method comprising passing the water solution through the membrane.

PBI membranes can be sulfonated, for example, after fabrication of the hollow fiber using a dip-and-dry procedure.

Unless otherwise indicated, the disclosure is not limited to specific procedures, materials, or the like, as such may vary. It is also to be understood that the terminology used herein is for the purpose of describing particular embodiments only and is not intended to be limiting.

As used in the specification and the appended claims, the singular forms "a," "an," and the include plural referents unless the context clearly dictates otherwise. Thus, for example, reference to "a solvent" includes not only a single solvent but also a combination or mixture of two or more different solvents.

The invention encompasses all combinations of recited particular and preferred embodiments. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein, including citations therein, are hereby incorporated by reference in their entirety for all purposes.

EXAMPLES

A Dope solution was prepared as follows: 18 wt % PBI dope and 2 wt % PVP (K16-18, Acros Organics, New Jersey) (a high molecular weight pore former with a molecular weight of 8000 daltons) in DMAc.

A Bore fluid was prepared as follows: 75 to 90 wt % IPA and 5 to 25 wt % DMAc.

The Coagulating bath was prepared containing 100% IPA.

A strong non-solvent selected from water, isopropyl alcohol, methanol and their combinations are used as the bore fluid and the coagulation bath. The strong nonsolvent has the ability to coagulate the polymer solution at the exit of the spinneret; therefore, a thin membrane layer will be formed between the outer polymer solution, otherwise the fiber is easily broken and the polymer solution will go down as liquid drop under the force of gravitation. Inner bore fluid is a mixture of non-solvent and the solvent to avoid formation of membrane layer. The spinneret is fabricated with 1.2 mm outer diameter and 0.4 inner diameter. This dope solution contains 26 wt % PBI and 2 wt. % LiCl in Ndimethylacetamide (DMAc). Following specific compositions of dope solution, bore fluid and coagulation bath was used to fabricate asymmetric PBI hollow fiber membrane with $H_2$ permeance of 300 GPU with defect free selective gas separating layer at the shell side.

High magnification pictures of fiber having a cross-section of 0.5 mm OD were taken. Similarly, high magnification pictures of fiber having a cross-section of 0.8 mm OD were taken. The images show porosity at the inner layer and a non-porous dense outer layer.

The dense layer provides the separation between the highly permeating $H_2$ and low permeating $CO_2$ whereas the porous layer provides mechanical strength with low pressure drop for the passage of the permeating gas. The testing of the fabricated fiber showed that the $H_2$ permeates more rapidly than $CO_2$ through the membrane. The permeance of $H_2$ increases with increasing temperature whereas the permeance of $CO_2$ is relatively insensitive to temperature.

The performance of prepared fibers was evaluated over 50 days, representing the performance over 1000 hours. The selectivity for $H_2/CO2$ improved with time increasing from 35 to 50, exceeding the design target of 40. Long-term performance evaluation data were obtained. The $H_2$ permeance value remained at about 80 GPU (Gas Permeation Unit) throughout the test period. At the end of the 1000-h test period, the $H_2$ permeance was measured to be 130 GPU at 250° C.

$H_2/CO_2$ was measured as a function of $H_2$ permeance in GPU units at 150, 200, 225, and 250° C. Both $H_2/CO2$ selectivity and $H_2$ permeance increased with increasing temperature up to 225° C. The ratio of $H_2/CO_2$ increases whereas the $H_2$ permeance decreases at 250° C. This suggests a slight increase in the thickness of the dense layer. Permeance increases as selectivity decreases. Dense layer thicknesses were tested between 1 and 10 µm, and could be tested as low as 0.1 µm.

The presence of macro-voids is highly dope-specific and is dependent strongly on the non-solvent and solvent exchange rate during coagulation. The measured $H_2$ permeance for a fiber containing macro-voids was in the range 100 to 200 GPU at room temperature but the $H_2/CO_2$ selectivity was only 5. The presence of macro-voids also reduces the mechanical strength of the fiber.

What is claimed is:

1. A method for preparing an asymmetric hollow fiber, the method comprising:
    (a) passing, through an outer annular orifice of a tube-in-orifice spinneret, a polymeric solution comprising: (i) 15-25 wt % of a polybenzimidazole; (ii) 1-5 wt % of a polymeric poreforming material; and (iii) a solvent with respect to the polybenzimidazole;
    (b) passing, though an inner tube of the spinneret, a bore fluid comprising: (i) 65-99 wt. % of a non-solvent with respect to the polybenzimidazole; and (ii) 1-35 wt. % of a solvent with respect to the polybenzimidazole, wherein the bore fluid maintains the polymeric solution in an annular shape;
    (c) dropping the polymeric solution and bore fluid through a gap, wherein the gap comprises an atmosphere and a dropping distance of 0.3 to 20 cm;
    (d) quenching the polymeric solution and bore fluid in a bath to form an asymmetric hollow fiber having an annular shape and comprising first and second concentric layers, wherein the first layer contacts the second layer and is non-porous, and wherein the second layer is porous having pores in the range 5-250 nm, and the chemical composition of the first layer and the chemical composition of the second layer are the same, wherein:
    the polybenzimidazole is sulfonated polybenzimidazole.

2. The method of claim 1, wherein the first layer forms an outer surface and the second layer forms an inner surface of the asymmetric hollow fiber.

3. The method of claim 1, wherein the first layer forms an inner surface and the second layer forms an outer surface of the asymmetric hollow fiber.

4. The method of claim 1, wherein the first layer has a thickness in the range 0.1-10 µm, and wherein the second layer has a thickness in the range of 10-500 µm.

5. The method of claim 1, wherein the outer annular orifice of the tube-in-orifice spinneret has an outside diameter in the range 100-2000 µm.

6. The method of claim 1, wherein the thickness of the first and second layers is controlled by the length of the dropping distance and by the relative polarities of the solvent and non-solvent.

7. The method of claim 1, wherein the first layer has a thickness in the range 0.1-10 µm, and wherein the second layer has a thickness in the range of 10-500 µm, and wherein the polymer precipitate partially solidifies during the dropping and fully solidifies during the quenching.

8. The method of claim 1:
    (a) comprising taking up the fiber into a fiber bundle at a rate of 1-100 meters/min to form a hollow fiber membrane;
    (b) wherein the polymeric solution is stable against chemical degradation for at least 6 months within a temperature range of 15-25° C.;
    (c) comprising post-spinning washing and drawing of the fiber; or
    (d) comprising any combination or subcombination of (a), (b), or (c).

9. An asymmetric hollow fiber comprising first and second concentric layers forming a wall of the fiber, wherein:
    the asymmetric hollow fiber comprises a sulfonated polybenzimidazole material;
    the first layer is non-porous and the second layer is porous having pores in the range 5-250 µm;

wherein the chemical composition of the first layer and the chemical composition of the second layer are the same; and the asymmetric hollow fiber has an outside diameter in the range 100-2000 µm.

10. The asymmetric hollow fiber of claim 9, wherein:
(a) the asymmetric hollow fiber is stable against chemical degradation up to 400° C.; or
(b) the first layer has a thickness in the range 0.1-10 µm, and wherein the second layer has a thickness in the range of 10-500 µm.

11. The asymmetric hollow fiber of claim 9, wherein the first layer forms an outer surface and the second layer forms an inner surface of the asymmetric hollow fiber.

12. A membrane comprising the asymmetric hollow fiber of claim 9 in a bundle.

13. A method for separating H2 from a gas mixture comprising H2, CO2, CO, and methane, the method comprising passing the gas mixture through the membrane of claim 12.

14. A method for removing impurities from a water solution, the method comprising passing the water solution through the membrane of claim 12.

* * * * *